US012718162B2

(12) United States Patent
Singh et al.

(10) Patent No.: US 12,718,162 B2
(45) Date of Patent: Aug. 25, 2026

(54) WORKFLOW OPTIMIZATION LEVERAGING GENERATIVE AI AND QUANTUM SIMULATION

(71) Applicant: Bank of America Corporation, Charlotte, NC (US)

(72) Inventors: Shailendra Singh, Maharashtra (IN); Nitin Desai, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 160 days.

(21) Appl. No.: 18/430,917

(22) Filed: Feb. 2, 2024

(65) Prior Publication Data

US 2025/0252376 A1 Aug. 7, 2025

(51) Int. Cl.
*G06Q 10/0633* (2023.01)
*G06F 9/451* (2018.01)
(Continued)

(52) U.S. Cl.
CPC ......... *G06Q 10/0633* (2013.01); *G06F 9/454* (2018.02); *G06Q 10/06312* (2013.01); *G06Q 10/0639* (2013.01)

(58) Field of Classification Search
None
See application file for complete search history.

(56) References Cited

U.S. PATENT DOCUMENTS 8,145,677 B2 3/2012 Al-Shameri
10,043,035 B2 8/2018 LaFever et al.
(Continued)

FOREIGN PATENT DOCUMENTS

JP 5559636 B2 7/2014
JP 2021507775 A 2/2021
(Continued)

OTHER PUBLICATIONS

Rao "Blockchain: A Study of New Business Model," Feb. 2023, in "Recent Advances in Blockchain Technology: Real-World applications," Intelligent Systems References Library, vol. 237, Springer, pp. 187-214 (Year: 2023).*

*Primary Examiner* — Ivan R Goldberg
(74) *Attorney, Agent, or Firm* — Banner & Witcoff, Ltd.

(57) ABSTRACT

Systems and methods are disclosed for optimization, management, and merging of processes. This system integrates a multifaceted technological framework, including generative artificial intelligence, quantum computing simulations, and blockchain technology. It features a user interface for inputting diverse workflow requirements, a generative AI module for processing these inputs, and a quantum computing module for simulating and optimizing workflows. The system utilizes blockchain for secure workflow deployment and a suite of specialized engines for prompt management, data extraction, analysis, optimization, deployment orchestration, and continuous monitoring. These components ensure the system's adaptability to user-specific needs, scalability across various industries, and capability for integration with existing enterprise systems. This invention revolutionizes BPM by streamlining processes, enhancing efficiency, and maintaining high security and customization standards.

20 Claims, 6 Drawing Sheets

(51) Int. Cl.

| | |
|---|---|
| ***G06Q 10/0631*** | (2023.01) |
| ***G06Q 10/0639*** | (2023.01) |

(56) References Cited

U.S. PATENT DOCUMENTS

| | | | | |
|---|---|---|---|---|
| 11,836,473 | B2 | 12/2023 | Franchitti | |
| 2009/0054919 | A2 | 2/2009 | Winters-Hilt et al. | |
| 2014/0279622 | A1 | 9/2014 | Lamoureux et al. | |
| 2017/0249445 | A1 | 8/2017 | Devries et al. | |
| 2017/0251985 | A1 | 9/2017 | Howard | |
| 2018/0276710 | A1 | 9/2018 | Tietzen et al. | |
| 2018/0307859 | A1 | 10/2018 | LaFever et al. | |
| 2019/0332807 | A1 | 10/2019 | LaFever et al. | |
| 2019/0371460 | A1 | 12/2019 | Gutierrez | |
| 2020/0205771 | A1 | 7/2020 | Barsimantov et al. | |
| 2020/0293564 | A1 * | 9/2020 | Reh | G06Q 10/0633 |
| 2020/0405418 | A1 | 12/2020 | Grubbs et al. | |
| 2022/0261882 | A1 | 8/2022 | Youb et al. | |
| 2024/0320060 | A1 * | 9/2024 | Sandridge | G06F 9/5094 |
| 2024/0430216 | A1 * | 12/2024 | Abraham | H04L 51/04 |

FOREIGN PATENT DOCUMENTS

| | | | |
|---|---|---|---|
| JP | 7064576 | B2 | 5/2022 |
| JP | 2022528564 | A | 6/2022 |
| JP | 7265987 | B2 | 4/2023 |

* cited by examiner

User Can Prompt System To Optimize Two Or More BPM Workflows - 102

Extract Metadata From BPM Workflow - 106

Method Optimized Two Or More BPM Workflows Leveraging Generative AI & Quantum Simulation Graphical Distribution of Performance of BPM Workflow Clusters - 312

WORKFLOW OPTIMIZATION LEVERAGING GENERATIVE AI AND QUANTUM SIMULATION

TECHNICAL FIELD

The present disclosure relates to Data Processing-Artificial Intelligence for analysis, monitoring, management, optimization, testing/simulation, merging, and deploying process or procedural workflows that are complex, voluminous, non-optimized, redundant, obsolete or the like, etc. through the use of generative artificial intelligence (AI), quantum simulations, and blockchains.

DESCRIPTION OF THE RELATED ART

Automated processes managed within various procedures or workflows can include complex, voluminous, non-optimized, redundant and/or obsolete sequences of tasks or activities designed to accomplish various system requirements. The workflows should be modeled, executed, and monitored digitally, enabling efficient management of organization processes. The workflows should include various decision points, user tasks, automated activities, and interactions with other systems, all orchestrated to streamline and optimize system operations.

However, over time, workflows (e.g., BPM or the like) accumulate exponentially, usually without adequate monitoring or management. This leads to redundant workflows, procedures, macros, etc. being created, either by people developing new one for their specific areas or immediate task or, in some instances, automatically by the system itself. Without regular review and optimization, inefficiencies and redundancies build up, affecting the overall effectiveness and efficiency of the systems and sub-systems.

Currently, such workflows are managed manually. Each team, responsible for a specific area of the application, manually reviews their workflow designs to streamline operations and reduce case volumes. They analyze why certain cases are created and work towards optimizing their workflows. This manual approach requires teams to deeply understand their application and devise optimized solutions, which can be time-consuming and may not always yield the most efficient results. This situation underscores the need for a mechanism to monitor, analyze, and optimize workflows over time to ensure they remain relevant and efficient.

The ongoing monitoring and optimization of such workflows are fraught with several intricate challenges. Adapting to Dynamic Environments: As organizations evolve, keeping workflows aligned with new strategies and objectives becomes increasingly complex. Managing Workflow Complexity: The intricate nature of workflows, especially in large or growing organizations, makes tracking and managing changes over time a daunting task. Analyzing Extensive Data: With the accumulation of vast amounts of operational data over time, effectively analyzing this information for workflow optimization becomes a significant challenge. Proactive vs. Reactive Optimization: Most BPM systems lack sophisticated, proactive optimization tools, often leading to a reactive approach that may not be as efficient. Regulatory and Compliance Adherence: As rules and regulations change, ensuring that workflows remain compliant adds another layer of complexity to the optimization process. Resource Allocation: Continuous monitoring and optimization demand substantial time, technical resources, and expertise, which might strain an organization's resources. These challenges necessitate a multifaceted approach and the integration of advanced technologies to enhance the efficiency and effectiveness of BPM workflows.

Specific problems exist when trying to merge workflows and provide optimizations thereof including, for example:

a. Compatibility Issues: Different platforms may use varying standards and formats, making it difficult to merge workflows from different systems.
b. Data Loss Risk: Merging workflows can lead to data loss or corruption if not handled correctly.
c. Complexity in Integration: Integrating disparate workflows can be complex and time-consuming, especially when dealing with legacy systems.
d. Workflow Disruptions: The process of merging can disrupt ongoing workflows, affecting operations.
e. Lack of Automation in Merging Process: Many process management software mechanisms do not offer automated tools for merging workflows, making the process manual and prone to errors.
f. Regulatory Compliance: Merging workflows from different systems must adhere to various compliance standards, which can be complex and vary by industry or region.
g. Loss of Process Integrity: The process of merging could distort the original workflow logic, leading to inefficiencies or errors in the new combined workflow.
h. Resource Intensiveness: The task of merging workflows often requires significant resources in terms of time, personnel, and technology.
i. Change Management Difficulties: Implementing a merged workflow can be challenging, as it may require retraining staff and adjusting to new processes.
j. Quality Assurance: Ensuring the quality and reliability of the merged workflow is critical, as any faults can lead to operational disruptions.

These challenges necessitate new strategic approaches and technical solutions, involving advanced tools and expertise, to successfully merge and optimize workflows and the like, such as, for example, through the use of generative artificial intelligence (AI), quantum simulations, and blockchains.

SUMMARY OF THE INVENTION

The inventions disclosed herein present cutting-edge systems and methods for optimizing BPM workflows. They uniquely integrate generative artificial intelligence, quantum computing simulations, and a multifaceted technological framework to enhance the creation and management of BPM workflows. An interface that allows users to input specific workflow requirements (or autonomous system operation may be used). The systems and methods intelligently process these inputs, leveraging a comprehensive workflow repository and advanced methods for workflow merging and optimization. The optimization process itself is innovative, utilizing clustering techniques, LSTM neural networks for performance complexity scoring, and quantum computing for advanced simulation tasks. A standout feature of the invention is its architectural design, which encompasses a range of specialized engines. These include prompt management, data extraction, analysis, optimization, deployment orchestration, and continuous monitoring engines. This modular design allows for a high degree of customization and scalability, ensuring the system can adapt to a wide range of user requirements and workflow complexities.

Furthermore, the system employs blockchain technology and smart contracts, ensuring not only the efficient deployment of workflows but also their security and integrity. This aspect is particularly helpful in the current digital landscape, where data security and trustworthiness are paramount. Overall, the invention represents a significant advancement in the field of workflow process management. By combining AI (including generative AI), quantum computing, and blockchain technologies, the systems and methods offer highly adaptable, secure, and efficient solutions for managing complex business workflows. The systems and methods are poised to revolutionize how organizations approach workflow optimization, ensuring processes are more streamlined, efficient, and effective.

In accordance with one or more arrangements of the non-limiting sample disclosures contained herein, solutions are provided to address one or more of the above issues and problems through leveraging generative AI and integrating it with quantum computing for, inter alia, optimizing, merging, or auto-generating BPM workflows. The method intelligently analyzes complexity parameters using generative AI and quantum simulation. Quantum computing is used to accelerate the process and simulate BPM workflows, enhancing the efficiency and effectiveness of workflow management in distributed environments. A combination of advanced technologies can be used including, inter alia:

a. Deep Analysis: Uses generative AI to conduct comprehensive evaluations of existing process workflows. This AI-driven analysis is designed to meticulously sift through workflow processes, pinpointing inefficiencies, bottlenecks, and areas that require improvement. By leveraging advanced AI capabilities, the system can identify patterns, anomalies, and optimization opportunities that might not be evident through traditional analysis methods. This deep dive into workflow structures enables organizations to understand their processes more thoroughly and identify strategic improvements, leading to enhanced efficiency and effectiveness in their operations.

b. Optimization Generation: Employs AI algorithms to create optimized workflows, offering solutions to identified inefficiencies. This component employs AI algorithms to craft optimized workflows as solutions to the inefficiencies identified in the deep analysis stage. This involves using AI to restructure existing workflows or create entirely new ones, focusing on enhancing efficiency, reducing redundancies, and improving overall performance. The AI algorithms can predict and simulate outcomes, allowing for the development of highly effective workflows tailored to specific operational needs and objectives. This advanced optimization process aims to transform inefficient processes into streamlined, effective operations.

c. Quantum Computing/Quantum Simulation: utilized primarily for two purposes: speeding up the processing of BPM workflows and simulating these workflows. The advanced computational capabilities of quantum computing enable the rapid analysis and optimization of complex workflows, significantly enhancing the efficiency of the process. Additionally, its ability to simulate workflows provides insights into their potential performance, allowing for more accurate and effective optimization and merging of BPM workflows.

d. Workflow Merging: Facilitates the merging of workflows from various systems, ensuring data integrity and maintaining efficiency. This feature addresses the challenge of integrating workflows from different systems. It ensures that when workflows are combined, the integrity of data is preserved, and overall operational efficiency is maintained. This aspect of the technology is relevant for organizations using multiple BPMS platforms or undergoing mergers and acquisitions, where disparate workflows must be consolidated. The AI-driven approach facilitates a seamless merger, reducing the risks of data loss, process disruption, and regulatory non-compliance, ensuring that the resulting workflow is both coherent and optimized.

e. Customized Responses: Develops workflows based on specific user inputs, tailoring them to meet unique organizational requirements. This component focuses on developing workflows tailored to specific user inputs, ensuring they meet the unique requirements of an organization. This feature allows the system to adapt workflows based on the specific needs, preferences, and objectives communicated by users. It offers a high degree of customization, enabling organizations to have workflows that are not only efficient and optimized but also highly relevant to their particular operational context. This ensures that the workflows are not just technically sound but also practically applicable and aligned with the organization's strategic goals.

f. Adaptive Dynamics: Equips workflows to dynamically adjust to evolving organization landscapes and regulatory changes, maintaining relevance and compliance. This feature ensures that workflows remain relevant, compliant, and effective even as external conditions shift. It allows for real-time adjustments and modifications in response to new organization strategies, market dynamics, and changing legal requirements, ensuring that the workflows are not only efficient but also up-to-date and compliant with current standards and regulations.

These and the other innovative approaches described herein drastically reduce manual efforts in managing BPM workflows, streamline operations, and enhance overall process outcomes in various organizational contexts.

Exemplary core inventive features include one or more of:

a. Optimization/Merging of BPM Workflows: Utilizes AI and quantum simulation for analyzing and optimizing complex BPM workflows, focusing on merging multiple processes into a more efficient structure.

b. Metadata Extraction and Workflow Generation: Extracts workflow metadata from various BPM systems to create new, user-prompt driven workflows, leveraging advanced AI techniques.

c. Abstract Syntax Tree (AST) and AI Algorithms (including other generative AI): Employs AST and deep learning algorithms like GPT for detailed analysis, optimization, merging, and construction of new BPM workflows.

d. Smart Contracts for Workflow Testing and Deployment: Uses blockchain-based smart contracts to test and deploy new BPM workflows in a secure and consensus-driven environment.

e. Intelligent Workflow Selection for Optimization/Merging: Identifies and selects BPM workflows needing optimization or merging based on a sophisticated analysis of complexity and performance metrics.

f. Deployment of Optimized Workflows Validated by Quantum Simulation: Ensures the deployed optimized BPM workflows deliver maximum performance, confirmed through quantum simulation.

g. Automatic Test Data Generation: Generates test data automatically to validate the efficiency and effectiveness of the optimized process workflows.

h. Distributed Ledger for Workflow Deployment: Implements a blockchain-based distributed ledger approach for deploying optimized BPM workflow packages, suitable for decentralized applications.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

The system employs generative AI to produce various BPM workflows, tailored to user requirements. It then simulates and evaluates these workflows for their performance and complexity. The most suitable workflow is chosen, either by creating a new one or by intelligently merging existing workflows to optimize for lower complexity and higher efficiency. This selection is data-driven, based on the extraction and analysis of workflow metadata. User prompts guide the system, allowing it to merge or modify workflows as needed to best suit the specific operational needs, ensuring an optimized, efficient BPM workflow system.

Various algorithms are suitable for analyzing BPM workflows. Abstract Syntax Trees are used to extract workflow code metadata, which assists in understanding the workflow's functions, conditions, and rules by creating a tree diagram. Advanced generative AI algorithms, akin to Generative Pre-trained Transformers (GPT), are utilized to generate new BPM workflows. These workflows are created by analyzing metadata properties of individual BPMs, determining whether to combine, merge, or create an entirely new BPM workflow.

Systems and methods incorporate smart contracts within a blockchain framework, creating a distributed system that interconnects multiple applications, each serving different organization functions. It extracts and analyzes information from these applications to formulate new or optimized BPM workflows. The process may require consent (or be automatic if desired), when merging or creating new workflows, to ensure their validity and readiness for deployment. This blockchain-based application manages the consent process and leverages smart contracts to enforce predefined rules, ensuring that the deployed BPM workflows are optimal and authorized for use.

The consent management process in this method is conducted through a blockchain-based system. This application collects inputs from various BPM applications to create and optimize workflows. By using smart contracts, predefined rules are followed before deploying the workflows. The deployment only occurs if these rules are satisfied, ensuring that the BPM workflows are both effective and approved for use. This approach enhances the security and reliability of deploying new or optimized workflows in a real-world environment.

Systems and methods utilize AI for advanced clustering, analyzing BPM workflows to determine if merging or creating new workflows is more beneficial. This involves intricate assessment of similarities, differences, and potential changes (delta changes) between workflows to decide if they can be effectively combined or if separate, unique workflows are more suitable. After identifying the optimal BPM workflow through comprehensive complexity and performance analysis, the system uses a blockchain-based distributed ledger framework to manage and secure the optimization process. This sophisticated approach ensures not only the effective merging or creation of workflows but also their secure and streamlined deployment in the operational environment.

In some arrangements, an artificial intelligence and quantum simulation system for merging, optimizing, and managing workflow processes, comprises one or more of:

a. a detailed user interface designed to receive various types of workflow requirements, including textual, graphical, and data-driven inputs;
b. a generative artificial intelligence (AI) module equipped with machine learning algorithms, capable of processing natural language inputs, generating workflow templates, and refining future suggestions based on user interactions;
c. a quantum computing module configured for advanced simulation of complex workflow scenarios, including multi-variable optimization and predictive modeling;
d. a blockchain network for secure workflow deployment, specifying the type of blockchain and employing smart contracts for automating workflow processes;
e. multiple specialized engines, including:
    i. a prompt management engine for handling diverse user queries;
    ii. a data extraction engine capable of processing data from various sources;
    iii. an analysis engine with detailed analytical methods for workflow assessment;
    iv. an optimization engine using advanced algorithms for streamlining workflows;
    v. a deployment orchestration engine for deploying workflows in various operational environments;
    vi. a continuous monitoring engine for real-time monitoring and automated workflow adjustments;
f. customization and scalability features allowing the system to adapt to different industry needs and workload demands;
g. integration capabilities with existing enterprise systems and software;
h. comprehensive security features including data encryption and access control; and
i. a user feedback mechanism for collecting insights on workflow efficiency and system usability.

In some arrangements, systems may also be configured with one or more of the following inclusions:

a. the continuous monitoring engine includes an anomaly detection feature for identifying and addressing workflow inefficiencies in real-time.
b. the generative AI module additionally employs deep learning techniques for enhanced pattern recognition and predictive analytics in workflow template generation.
c. the quantum computing module further includes a feature for real-time adjustment of workflows based on predictive analytics outcomes.

d. the blockchain network includes a feature for automatically updating smart contracts in response to changes in workflow parameters or system outputs.

e. the prompt management engine additionally includes a user history tracking feature to personalize responses based on past interactions.

f. the data extraction engine is further enhanced with the ability to integrate and process unstructured data sources.

g. the analysis engine includes advanced statistical modeling tools for more detailed performance assessment of workflows.

h. the optimization engine employs AI-based resource allocation algorithms for optimizing workflow resource utilization.

i. the deployment orchestration engine is further capable of deploying workflows in a cloud computing environment.

j. the continuous monitoring engine includes an anomaly detection feature for identifying and addressing workflow inefficiencies in real-time.

In some arrangements, an artificial intelligence and quantum simulation method for merging, optimizing, and managing workflow processes, can comprise one or more steps such as:

a. receiving detailed workflow requirements via a multi-functional user interface, where the interface supports input modalities including, but not limited to, textual entry, voice commands, graphical data import, and direct data feed integration;

b. utilizing a generative artificial intelligence (AI) module, where the module processes inputs through advanced natural language processing algorithms, machine learning techniques, and contextual analysis to generate initial workflow configurations;

c. implementing quantum computing simulations for each proposed workflow, wherein the simulations analyze multiple operational scenarios, assess potential bottlenecks, and identify optimization opportunities through quantum-based predictive algorithms;

d. integrating workflow configurations with a blockchain network, employing specific smart contract protocols to ensure workflow execution integrity, data security, and compliance with predetermined operational parameters;

e. operating a suite of specialized engines, where each engine executes distinct functions:

i. a prompt management engine with adaptive response capabilities, utilizing user interaction history to personalize future interactions and workflow suggestions;

ii. data extraction engine capable of processing heterogeneous data formats, extracting relevant information, and standardizing data for system-wide use;

iii. an analysis engine that employs both statistical and AI-driven tools to evaluate workflow performance metrics, providing insights into efficiency and effectiveness;

iv. an optimization engine that implements a combination of machine learning, heuristic algorithms, and resource allocation models to refine and enhance workflow structures;

v. a deployment orchestration engine equipped to handle diverse operational environments, including cloud-based, on-premises, and hybrid infrastructure setups;

vi. a continuous monitoring engine that not only tracks workflow execution in real-time but also employs anomaly detection algorithms to preemptively identify and address potential issues;

f. tailoring system functionalities to align with specific industry requirements, regulatory constraints, and organizational goals, ensuring a highly customizable and scalable solution;

g. seamlessly integrating the BPM optimization system with existing enterprise resource planning (ERP), customer relationship management (CRM), and other relevant systems for cohesive operational management;

h. implementing multi-layered security protocols, including end-to-end encryption, role-based access control, and continuous security auditing, to safeguard data integrity and compliance; and i. establishing a feedback loop mechanism that captures user experiences, system performance data, and workflow efficacy metrics, utilizing this information for iterative improvements and system updates.

In some arrangements, methods may also include one or more of:

a. enhancing the natural language processing capabilities of the generative AI module to interpret and process industry-specific jargon and terminologies.

b. the quantum computing simulations are further refined to include real-time data feeds, enabling dynamic adjustment of workflow simulations based on current operational data.

c. the customization of smart contract protocols on the blockchain network to align with specific regulatory compliance requirements of different industries.

d. the prompt management engine further includes multilingual support, enabling interaction with users in multiple languages for global application.

e. integrating advanced data visualization tools within the analysis engine for more effective presentation and interpretation of workflow performance metrics.

f. the optimization engine further employs environmental impact assessments to optimize workflows for sustainability and reduced carbon footprint.

g. where the continuous monitoring engine utilizes machine learning algorithms to predict future workflow challenges and recommend preemptive adjustments.

In some arrangements, an artificial intelligence and quantum simulation method for merging, optimizing, and managing workflow processes, can comprise one or more of the steps of:

a. receiving workflow requirements through a detailed user interface, capable of handling various types of inputs including textual, graphical, and data-driven inputs;

b. processing the received workflow requirements using a generative artificial intelligence (AI) module equipped with machine learning algorithms;

c. simulating complex workflow scenarios using a quantum computing module, which includes multi-variable optimization and predictive modeling;

d. employing a blockchain network for the secure deployment of workflows, where the network uses smart contracts to automate workflow processes;

e. operating multiple specialized engines, including:

i. a prompt management engine for handling diverse user queries and providing personalized responses;

ii. a data extraction engine for processing and normalizing data from various sources;

iii. an analysis engine with advanced analytical methods for workflow performance assessment;
iv. an optimization engine using advanced algorithms for streamlining workflows and AI-based resource allocation;
v. a deployment orchestration engine for deploying workflows across various operational environments;
vi. a continuous monitoring engine for real-time monitoring and automated adjustments of workflows;

f. customizing and scaling the system based on different industry needs and workload demands;
g. integrating the system with existing enterprise systems and software for seamless operational continuity;
h. implementing comprehensive security measures, including data encryption and access control; and
i. collecting user feedback on workflow efficiency and system usability for continuous system improvement.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
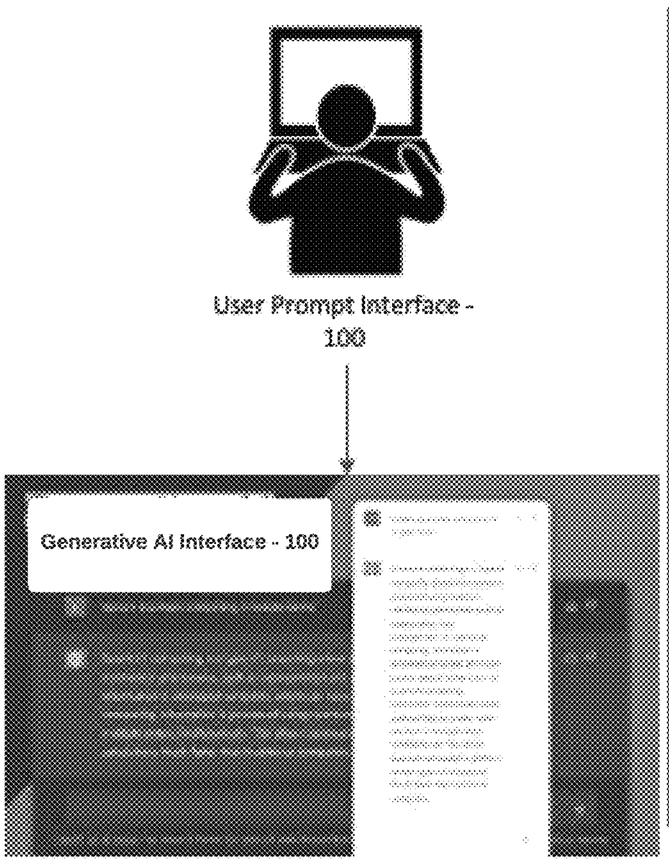
FIG. 1 depicts a concept diagram showing sample interactions, interfaces, steps, functions, and components in accordance with one or more aspects of this disclosure as they relate to merging and optimizing workflows.
Figure 1:
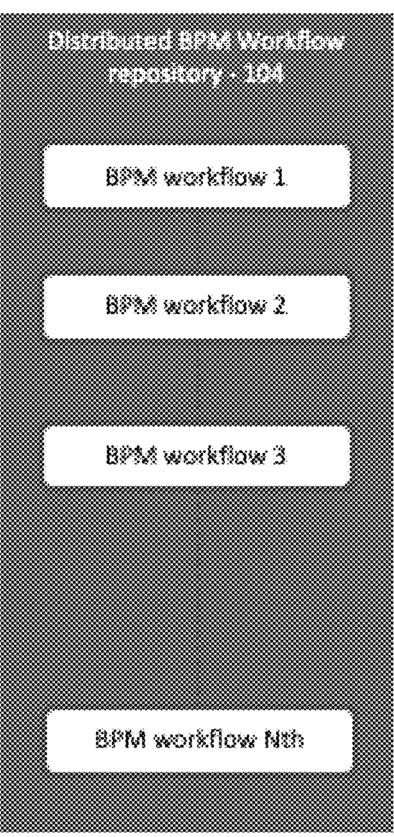
Figure 1:
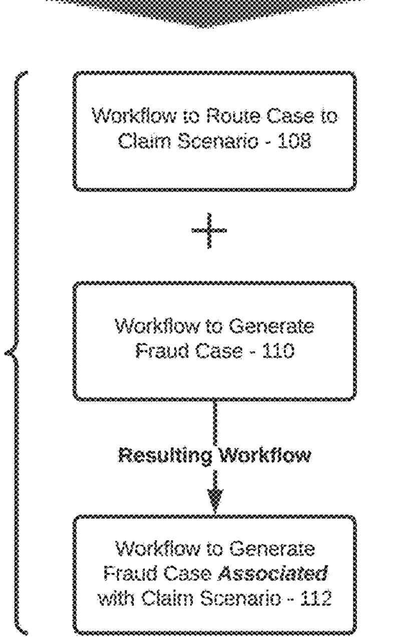

In the following description of the various embodiments to accomplish the foregoing, reference is made to the drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general computer/software components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

As used herein, Generative Artificial Intelligence (AI) refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 depicts a concept diagram showing sample interactions, interfaces, steps, functions, and components in accordance with one or more aspects of this disclosure as they relate to merging and optimizing workflows. FIG. 1 showcases the process of user interaction with the system, generative AI interface, and the method to optimize or merge BPM workflows.

Moreover, FIG. 1 illustrates the initial interaction process between the user and the BPM optimization system. It may show how user inputs are received and processed by the generative AI interface. This interface could be responsible for initiating the optimization or merging of BPM workflows, highlighting the system's responsiveness to specific user needs and requirements. This figure sets the stage for understanding the user-system interaction and the initiation of the workflow optimization process.

In FIG. 1, the process starts with the User Prompt Interface (100), where users input specific requirements or commands. These inputs are then processed by the Generative AI Interface (102), which interprets and translates these requirements into actionable tasks. The Workflow Repository (104) serves as a database for various BPM workflows (106), providing a selection for potential optimization or merging. The Workflow Merging/Optimization Method (108) is the component where actual optimization occurs, leveraging AI and quantum simulation to enhance or create new workflows. The end result is an optimized or newly created BPM workflow (110), tailored to the specific requirements inputted by the user.

FIG. 1 showcases a comprehensive process where users interact with the system by providing various types of prompts to the generative AI. These prompts could range from requests to merge specific workflows to optimizing multiple workflows. The system then delves into a distributed BPM workflow repository, extracting and analyzing metadata from each workflow. This analysis helps in identifying similarities, potential merges, and optimization areas. As one industry example, in complex scenarios like banking where workflows for fraud and claim management might intersect, the system intelligently evaluates if and how these workflows can be merged for efficiency. The system not only generates various workflow scenarios but also employs quantum simulation to determine—of the possible scenarios and combinations thereof—the most optimal one, focusing on reduced complexity and enhanced performance, while meeting user-specific requirements. This detailed process underscores the system's capability to manage BPM workflows adaptively and intelligently.

Figure 2:
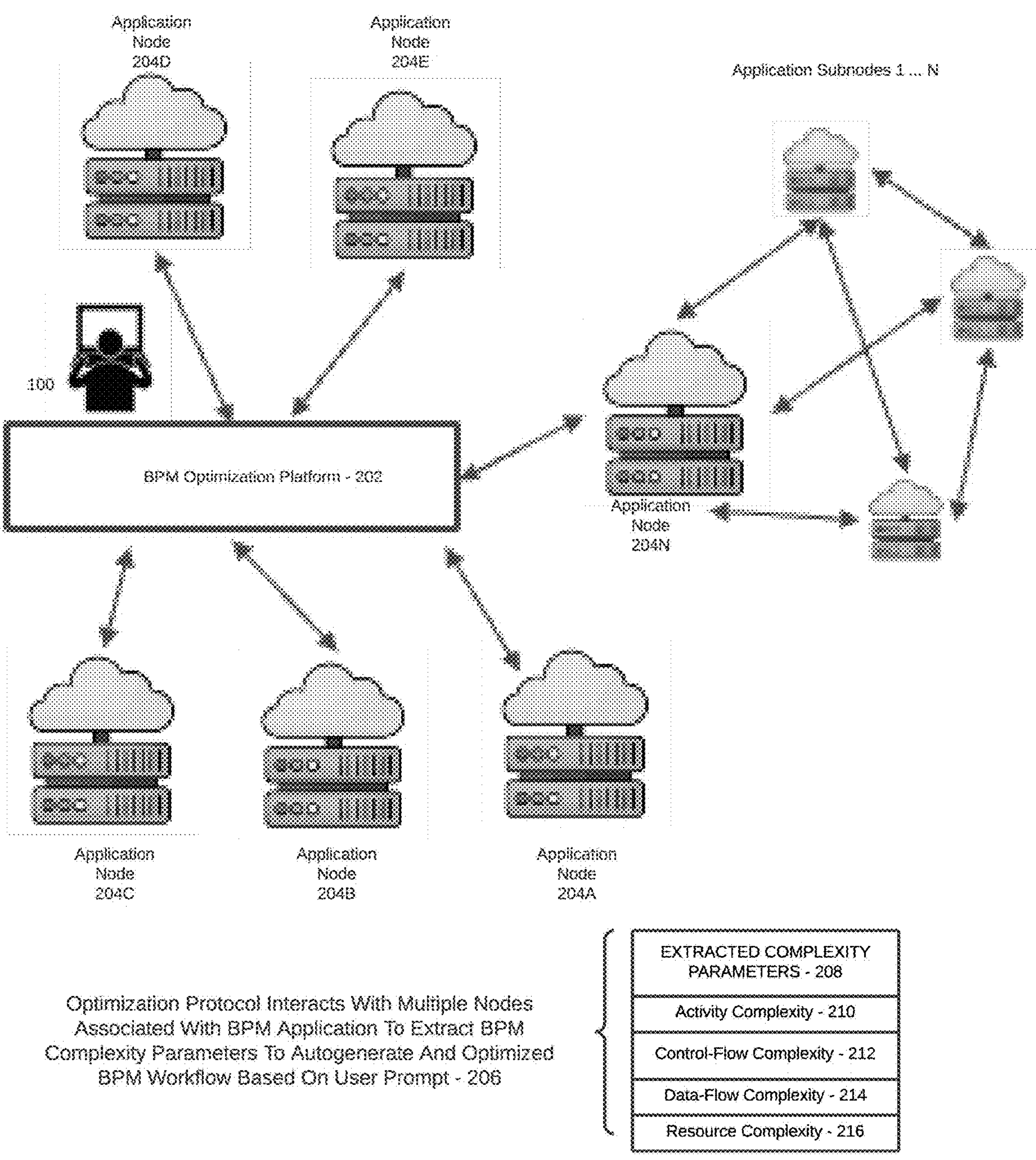
FIG. 2 depicts an exemplary diagram showing sample interactions, interfaces, steps, functions, and components in accordance with one or more aspects of this disclosure as they relate to analyzing workflows on distributed network(s).

By way of non-limiting disclosure, FIG. 2 depicts an exemplary diagram showing sample interactions, interfaces, steps, functions, and components in accordance with one or more aspects of this disclosure as they relate to analyzing workflows on distributed network(s). FIG. 2 depicts the distributed BPM application environments, indicating how the optimization protocol interacts with multiple nodes and/or sub-nodes to extract complexity parameters for auto-generating optimized BPM workflows.

Further, FIG. 2 represents the distributed nature of the BPM application environments. It shows the system's interaction with various network nodes, indicating how the optimization protocol extracts complexity parameters from these nodes. This extraction is essential for the system's ability to auto-generate optimized BPM workflows, demonstrating the distributed and interconnected nature of the process. This illustrates how the system leverages a distributed network to enhance the efficiency and efficacy of workflow optimization.

FIG. 2 illustrates the Distributed BPM Application Environments. It shows the BPM Optimization Platform (202) interacting with multiple application nodes (204A, 204B, 204C, 204D, 204E) and their sub-nodes. The optimization protocol (206) engages with these nodes to extract BPM complexity parameters (208), including activity complexity (210), control-flow complexity (212), data-flow complexity (214), and resource complexity (216). This setup underlines the system's ability to pull varied and complex data from a distributed network for optimizing BPM workflows.

Stated differently, the diagram shows the BPM Optimization Platform (202) at the center, which connects to multiple distributed application nodes (204A-E), each potentially representing a different part of a procedure or process. These nodes feed complex workflow data to the platform, which can include activity, control-flow, dataflow, and resource complexity parameters (208). The optimization protocol (206) within the platform processes this data to enhance or merge BPM workflows. This representation emphasizes the system's capacity to handle and integrate diverse and complex data from a distributed network for effective BPM workflow optimization.

The BPM Optimization Platform of this distributed system interconnects various BPM applications across different nodes. Each node, potentially representing a distinct application or department (e.g., card services, fraud detection, customer complaints, etc.), contributes unique workflows to the system. Stated differently, different BPM applications are distributed across various nodes, each possibly running a unique BPM system or function. This is where the BPM Optimization Platform comes into play. It integrates these applications to optimize the entire BPM infrastructure, reducing redundancy and enhancing performance. The system interacts with these nodes, extracting information to derive a new optimized system. Some nodes may have sub-applications, each contributing to the overall BPM functionality. The optimization protocol of the platform actively listens to these applications, monitoring workflows deployed across various nodes. It assesses these workflows against set criteria like activity, control-flow, dataflow, and resource complexity, to construct, merge, or split workflows based on the requirements pushed to the generative AI. This detailed mechanism exemplifies the comprehensive approach of the system in optimizing BPM workflows by leveraging a distributed system architecture.

The platform continuously monitors these workflows, assessing their complexity across various parameters. It then processes user requirements through generative AI to adapt, merge, or even split these workflows, striving for an optimal BPM structure. This intelligent, ongoing interaction and monitoring help in constructing workflows that are more streamlined and efficient, reflecting a responsive and dynamic optimization process tailored to the specific needs of each department or application within the organization.

Figure 3:
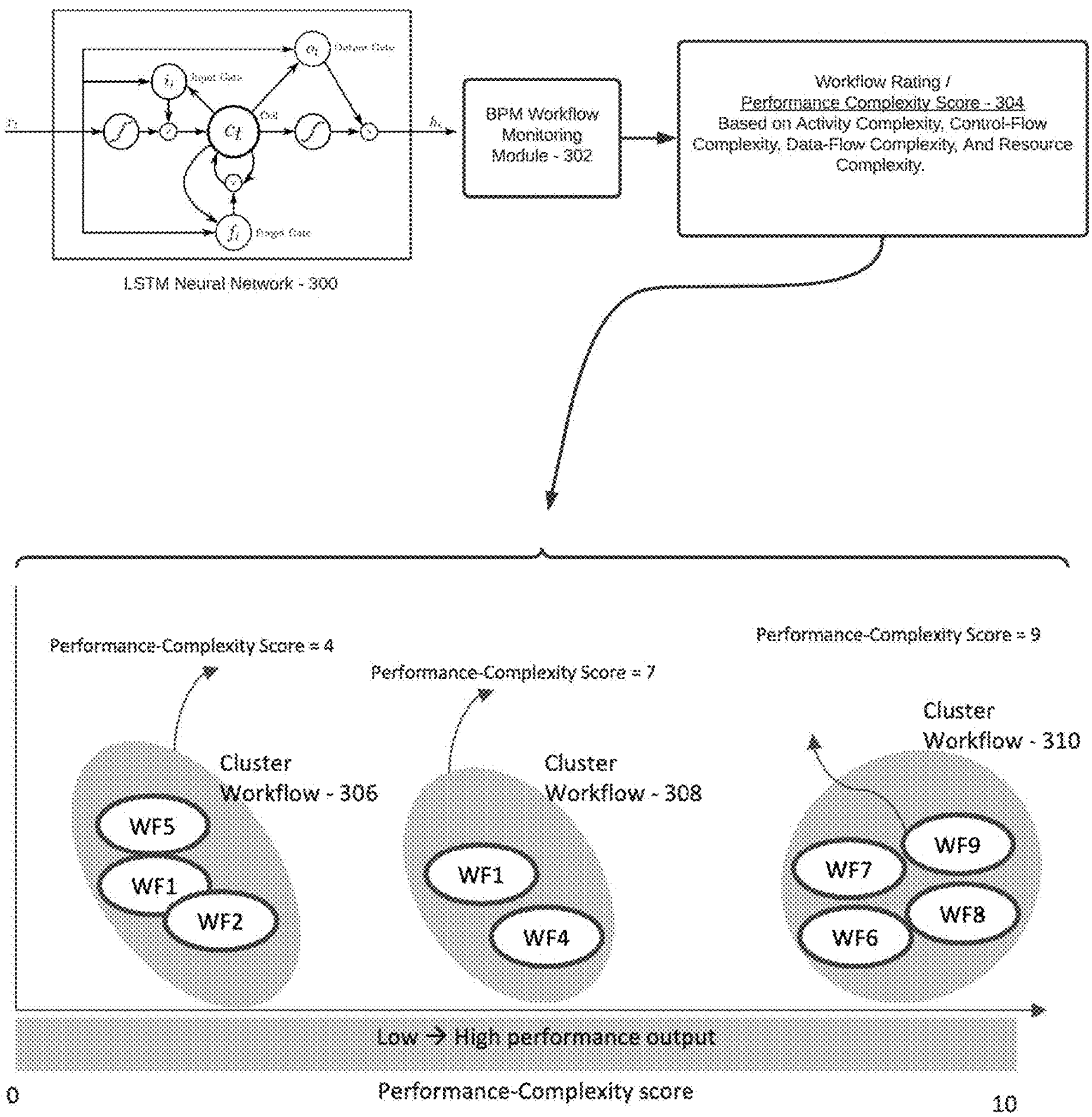
FIG. 3 depicts a clustering and optimization diagram showing sample interactions, interfaces, steps, functions, and components in accordance with one or more aspects of this disclosure as they relate to a workflow analyzer.

By way of non-limiting disclosure, FIG. 3 depicts a clustering and optimization diagram showing sample interactions, interfaces, steps, functions, and components in accordance with one or more aspects of this disclosure as they relate to a workflow analyzer. FIG. 3 presents a workflow rating and performance/complexity scoring system, involving an LSTM neural network or the like, to categorize and analyze BPM workflows.

This system categorizes and analyzes BPM workflows based on their performance and complexity. Such a scoring system is relevant for assessing the efficiency of different workflows, guiding the optimization process by identifying which workflows require attention or modification. This figure illustrates the data-driven approach to workflow management.

In FIG. 3, the BPM Workflow Monitoring Module (302) and LSTM Neural Network (300) work together to analyze BPM workflows. The module assesses various complexities in these workflows, assigning a performance-complexity score (304). Workflows are then clustered (306, 308, 310) based on these scores, effectively categorizing them for better management and optimization. A graphical distribution (312) illustrates the varying performance levels across these clusters, highlighting the system's sophisticated approach in evaluating and categorizing BPM workflows to optimize their efficiency and effectiveness.

The system's generative AI plays a pivotal role in customizing BPM workflows based on user requirements. When a user specifies a need for a particular workflow, the AI system delves into a network of interconnected nodes, each representing different BPM applications. It extracts and analyzes relevant BPM data from these nodes, clustering them to form new workflow combinations that potentially meet the user's needs. For instance, combining workflows 1, 2, 3, and 5 might generate one suitable workflow, while another combination like 1, 4, or 7, 9, 8, 6 could form others. The AI system evaluates as many of these combinations as desired, assessing their performance and complexity, to rate them on a scale (e.g., 0 to 10). The workflow with the best score, indicating high optimization, is then selected as the most suitable for the user's requirement. This process underscores the AI's ability to intelligently create and optimize BPM workflows in a dynamic, user-centric manner. Given the extensive number of potential workflows and parameters to generate, simulate, test, score, and the like, quantum computing is utilized.

The deployment process involves not just selecting an optimal BPM workflow but also ensuring its effectiveness and efficiency in an actual environment. The system utilizes quantum simulation to test multiple workflows in parallel, significantly speeding up the optimization process. This approach allows for simultaneous testing of various configurations, enabling quick identification of the best-performing workflow. By using quantum computing for simulation and the like, the system efficiently evaluates all possible workflow combinations, ensuring that the selected workflow is not only optimized but also practically viable for real-world application. This innovative use of quantum simulation demonstrates a significant advancement in optimizing BPM workflows.

Set forth below are sample performance and complexity parameters in the BPM workflow optimization:

a. Activity Complexity: It evaluates the number of activities within a process. A high number of activities, even in a straightforward sequential process, increases this complexity, impacting the process's overall manageability.

b. Control-Flow Complexity: This parameter is influenced by the structural elements of a process, such as the various splits and joins, which define the process's flow. The more complex these elements are, the higher the control-flow complexity, affecting how the process is managed and executed.

c. Data-Flow Complexity: Concerns the intricacies of the process's data structures and the relationships between them. This complexity grows with the sophistication of these structures and the dependencies between different process activities, affecting the process's efficiency and data management.

d. Resource Complexity: Focuses on the resources required by the process, including human, informational, and technological resources. The complexity here is determined by how these resources are organized and utilized, with implications for administrative efficiency and resource allocation.

These parameters collectively provide a comprehensive view of a BPM workflow's complexity, guiding the optimization and streamlining of processes for better performance and efficiency.

Figure 4:
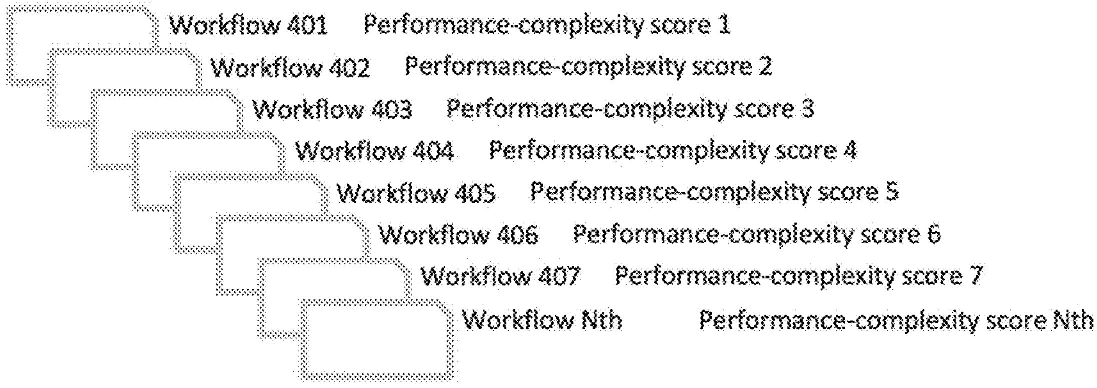
FIG. 4 depicts a quantum engine diagram showing sample interactions, interfaces, steps, functions, and components in accordance with one or more aspects of this disclosure as they relate to optimization and simulation.
Figure 4:
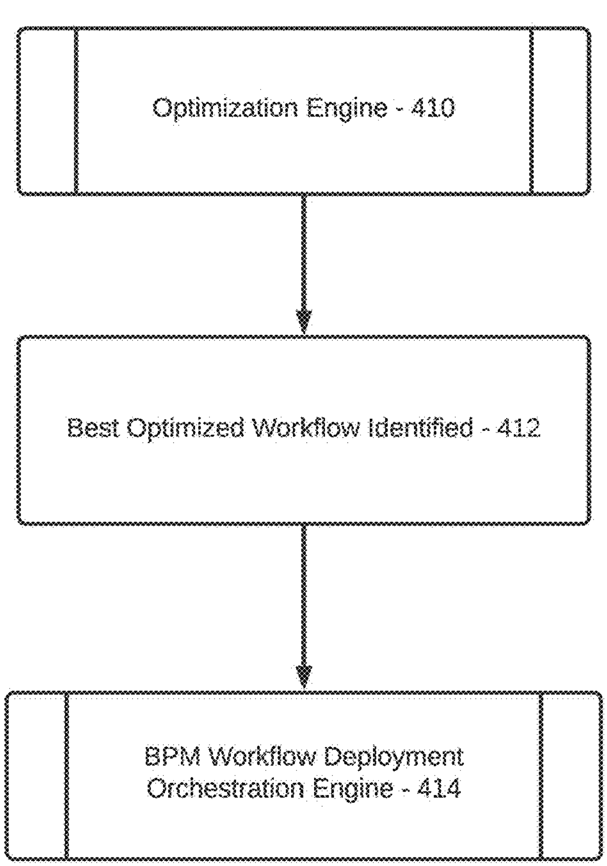

By way of non-limiting disclosure, FIG. 4 depicts a quantum engine diagram showing sample interactions, interfaces, steps, functions, and components in accordance with one or more aspects of this disclosure as they relate to optimization and simulation. FIG. 4 focuses on the creation of multiple workflows by generative AI, the optimization engine's role in identifying the best workflow, and the deployment orchestration process.

Further, FIG. 4 illustrates the process of creating multiple BPM workflows using generative AI. It may show how these workflows are evaluated by an optimization engine to identify the most effective one. The figure also shows the deployment orchestration process, highlighting how the selected optimized workflow is implemented in a real-world environment. This figure illustrates the workflow generation, evaluation, and deployment phases of the system.

FIG. 4 depicts the BPM workflow optimization process. The generative AI system generates multiple BPM workflows. The system then evaluates each workflow through quantum simulation, computing their performance and complexity scores. The best-suited workflow is selected for deployment, guided by smart contracts that set conditions for its implementation on the BPM platform. The orchestration engine manages this deployment, ensuring all interconnected systems give consent, reflecting the interconnected nature of these applications. This depiction emphasizes the intelligent selection and deployment of optimized workflows in a complex, interconnected system environment.

Stated differently, the depicted process involves the generative AI system producing various BPM workflows, among which some might be irrelevant or impractical. These workflows undergo quantum simulation for a comprehensive evaluation, assessing both their performance and complexity. The most suitable workflow, determined by its optimization scores, is chosen for actual deployment. This process is facilitated and validated by smart contracts, ensuring the workflow meets predefined criteria before deployment. The orchestration engine manages this deployment process, emphasizing collaboration and consent among interconnected systems. This reflects the system's capability to intelligently generate, assess, and deploy workflows in a complex, interconnected application environment.

The system ensures the created workflow aligns with other applications, preventing dissonance. The selected workflow passes through a smart contract in a blockchain system, where each application gives consent based on specific parameters and conditions. After this consent process, the workflow is orchestrated for deployment. This method ensures synchronization and agreement across different applications, emphasizing the importance of collaborative integration in the workflow deployment process.

Figure 5:
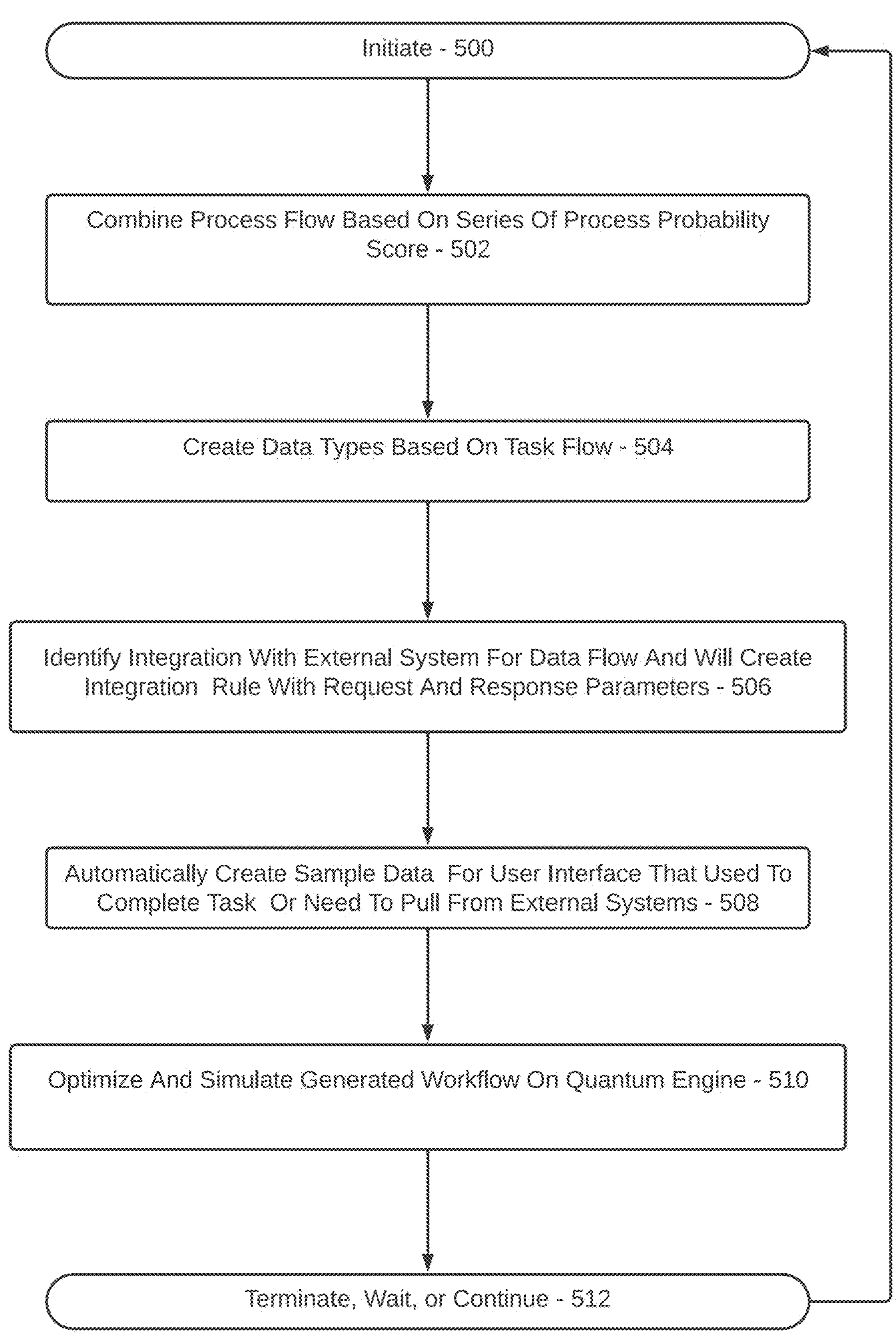
FIG. 5 depicts a sample, functional, flow diagram in accordance with one or more aspects of this disclosure.

By way of non-limiting disclosure, FIG. 5 depicts a sample, functional, flow diagram in accordance with one or more aspects of this disclosure. FIG. 5 details the procedure from initiating the process to optimizing and simulating generated workflows on a quantum engine, including steps like combining process flows and creating data types.

FIG. 5 depicts the comprehensive process from the initiation of the BPM workflow optimization to the final steps involving quantum simulation. It shows various stages such as combining process flows, creating specific data types, and simulating the generated workflows on a quantum engine. This figure demonstrates the step-by-step procedure that the system follows, encompassing everything from initial data gathering and processing to the final optimization and simulation stages.

The process begins with initiating the optimization (500), where workflows are selected for enhancement. The combining of process flows (502) involves integrating different workflows based on their likelihood of improving efficiency. Data types are then created (504) to match the tasks within these workflows, ensuring data consistency. This is followed by integrating with external systems and establishing rules for data exchange (506), enhancing the workflow's adaptability. Automatic creation of sample data (508) aids in testing the workflow's functionality in user interfaces. The optimization and simulation on a quantum engine (510) provide advanced testing and refinement. Finally, a decision is made (512) on whether to proceed with, delay, or terminate the optimization based on the results.

In other words, the system's approach to BPM workflow optimization involves a series of methodical steps. Initially, it combines process workflows based on their process probability scores, indicating how likely they are to enhance overall process efficiency. The system then creates specific data types that correspond to the tasks within these workflows and integrates with external systems for comprehensive functionality. It generates sample datasets to rigorously test the workflows, using quantum simulation to evaluate their effectiveness. This thorough testing ensures the selected workflow is not only theoretically sound but also practically viable and optimal in real-world scenarios.

Figure 6:
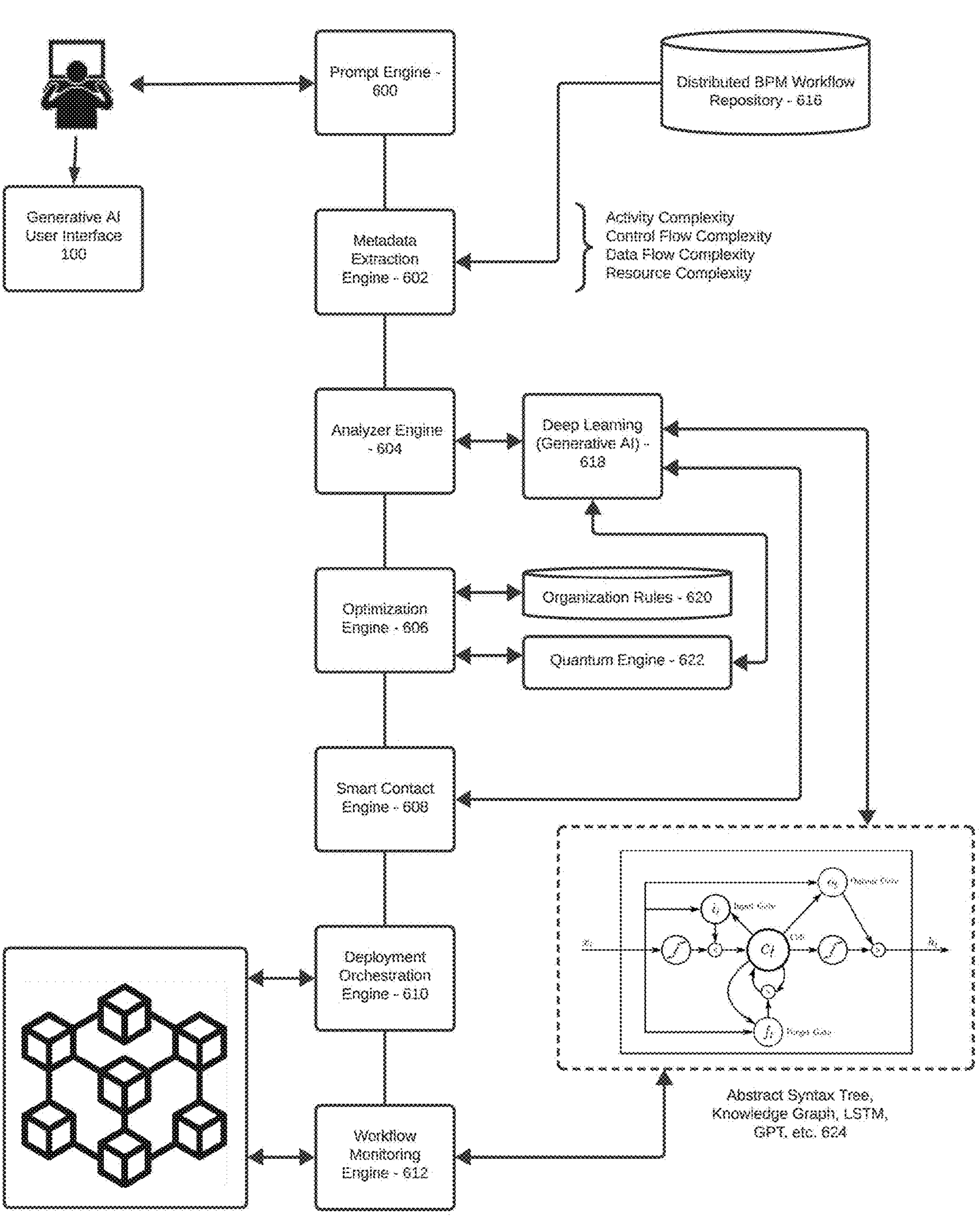
FIG. 6 depicts an architecture diagram showing sample interactions, interfaces, steps, functions, and components in accordance with one or more aspects of this disclosure as they relate to an optimization platform.

By way of non-limiting disclosure, FIG. 6 depicts an architecture diagram showing sample interactions, interfaces, steps, functions, and components in accordance with one or more aspects of this disclosure as they relate to an optimization platform. FIG. 6 provides an overview of the system architecture, highlighting components such as the prompt engine, metadata extraction engine, analyzer engine, quantum engine, and the role of blockchain networks and smart contracts.

FIG. 6 provides a detailed overview of the system architecture for the BPM workflow optimization process. It might showcase various components such as the prompt engine, metadata extraction engine, and analyzer engine. The figure also shows the role of the quantum engine in the optimization process, and how blockchain networks and smart contracts are integrated for secure and efficient workflow deployment. This figure illustrates the interconnected roles of different technological components in the system.

At a high level, the overall architecture of the BPM workflow optimization system includes various engines and modules:

a. Prompt Engine (600): Manages user inputs or prompts.
b. Metadata Extraction Engine (602): Extracts important data and characteristics from BPM workflows.
c. Analyzer Engine (604): Analyzes the extracted data, likely using AI techniques.
d. Optimization Engine (606): Responsible for optimizing the BPM workflows.
e. Smart Contract Engine (608) and Blockchain Network (s) (614): Manage secure deployment and consent processes.
f. Deployment Orchestration Engine (610): Handles the deployment of optimized workflows.
g. Workflow Monitoring Engine (612): Continuously monitors the performance of workflows.
h. Distributed BPM Workflow Repository (616): Stores and manages various BPM workflows.
i. Deep Learning (Generative AI) (618) and Quantum Engine (622): Utilized for advanced processing and simulations.
j. Organization Rules (620): Govern the system's operations.
k. Abstract Syntax Tree, Knowledge Graph, LSTM, GPT, etc. (624): Various technologies and algorithms supporting the system.

Thus, the figure illustrates the integration of multiple advanced technologies and modules for comprehensive workflow optimization.

As shown, the architecture combines various advanced technologies for an efficient BPM workflow optimization system. The Prompt Engine (600) initiates the process based on user inputs, while the Metadata Extraction Engine (602) gathers critical data from existing workflows. The Analyzer Engine (604) applies AI techniques to analyze this data, and the Optimization Engine (606) refines workflows for improved efficiency. The integration of smart contracts (608) and blockchain networks (614) ensures secure and transparent workflow deployment. The Deployment Orchestration Engine (610) manages the actual rollout of workflows, and the Workflow Monitoring Engine (612) tracks their ongoing performance. The system leverages deep learning and quantum computing (618, 622) for advanced data processing, guided by organizational rules (620) and supported by various algorithms like AST, knowledge graphs, GPT, or the like as desired (624).

FIG. 6 illustrates a modular approach to BPM workflow optimization. It features a prompt generation system where users input requirements in simple language. These prompts, ranging from merging BPMs to creating new ones, are processed by the generative AI component of the system. The AI then interprets these prompts, contextualizing and directing the system to gather relevant information from various interconnected systems. This modular design facilitates efficient processing of user requirements, guiding the system's actions towards optimizing BPM workflows as per the user's specific needs.

The BPM Workflow Metadata Extraction Engine is relevant for retrieving and analyzing existing workflows. It delves into source systems, extracting vital workflow data and employing AI for in-depth analysis. This includes understanding workflow contexts, connections, and interactions with external systems to gauge complexity. The BPM Workflow Optimization Engine integrates these insights with requirements or rules to construct new, optimized workflows. Meanwhile, the Quantum Engine and Deep Learning Engine work collaboratively, processing the array of workflows generated by the AI. Quantum simulation plays a pivotal role in this phase, helping to pinpoint the most optimal workflow out of the many generated, ensuring efficiency and effectiveness in the system's output.

Once the system identifies the optimal workflow, a smart contract in the blockchain network is triggered to seek consent from all relevant application systems. If consent is achieved for the selected workflow, it is then forwarded to the Workflow Deployment Orchestration Engine. This engine is responsible for deploying the optimized workflow onto the actual system, ensuring that it is implemented, and functions as intended in the real-world environment. This process shows collaborative approval and systematic deployment in the workflow optimization process.

More specifically, the process of seeking consent and workflow deployment in the context of FIG. 6 can be understood as follows:

a. Smart Contract and Blockchain Network: After the Generative AI system identifies the best-suited workflow through quantum simulation and optimization, the next critical step is to ensure that all relevant application systems are aligned with this choice. This is where the concept of a smart contract, within a blockchain network, comes into play.
b. Smart Contract: A smart contract is a self-executing contract with predefined rules and conditions directly written into code. In this scenario, it acts as a digital agreement that governs the acceptance of the selected workflow.
c. Blockchain Network: Blockchain is a decentralized and immutable digital ledger technology. It is utilized to maintain transparency and trust among all participating application systems. Each application system within the network has a copy of this ledger, ensuring that there's no single point of control or failure.
d. Seeking Consent: The selected workflow, which has been optimized based on performance and complexity, is proposed for deployment. However, before implementing it in the live environment, consent is required from all relevant parties or application systems.
e. Consent Process:
   i. Consensus Mechanism: The smart contract defines the conditions under which the workflow can be deployed. These conditions can include factors like performance, compatibility, security, and compliance. All application systems must reach a consensus based on these predefined conditions.
   ii. Consent Validation: Each application system within the blockchain network reviews the proposed workflow and verifies whether it aligns with their own requirements and objectives. They also evaluate the potential impact on their processes and systems.
   iii. Voting and Agreement: The blockchain network facilitates a voting or agreement process where each application system can cast its vote. This can be in the form of accepting or rejecting the proposed workflow based on their assessment.

iv. Consent Records: As votes are cast and agreements reached, the blockchain ledger records these interactions. This ensures transparency and auditability of the consent process.

f. Deployment Orchestration: Once the smart contract receives the necessary consensus and agreement from all application systems, it triggers the Workflow Deployment Orchestration Engine.

g. Workflow Deployment Orchestration Engine: This component is responsible for the actual deployment of the optimized workflow onto the live system. It ensures that the implementation is seamless and adheres to the agreed-upon conditions. This includes configuring the necessary connections, data flows, and integrations.

h. Monitoring and Maintenance: After deployment, the workflow continues to be monitored for its performance and adherence to the specified conditions. Any issues or deviations from the agreed-upon criteria can trigger alerts and corrective actions.

i. Iterative Process: The entire workflow optimization process is often iterative. If changes are needed or if new requirements arise in the future, the system can go through the same cycle of optimization, consensus seeking, and deployment.

This process ensures that the selected workflow not only meets the technical criteria but also aligns with the needs and objectives of all application systems within the ecosystem. It represents a collaborative and transparent approach to workflow optimization and deployment in a complex and interconnected environment.

Regarding the role of the BPM Workflow Monitoring Engine and the methods employed, such as Abstract Syntax Trees (AST) and Knowledge Graphs, it can be further understood as follows.

a. BPM Workflow Monitoring Engine:

i. Dynamic Monitoring: The BPM Workflow Monitoring Engine is a relevant component that continuously observes the entire infrastructure of BPM applications. This monitoring is dynamic and ongoing, as BPM environments are highly dynamic, with workflows constantly being created, modified, or retired.

ii. Real-time Evolution: The system acts as an evolving entity itself. Users can prompt the system to adapt and provide new BPM workflows at specified frequencies. This feature ensures that the system remains up to date with the latest developments and requirements in the BPM landscape.

iii. Automatic Optimization: One of the primary functions of the monitoring engine is to automatically optimize workflows. As new workflows are deployed by various teams and departments within an organization, the monitoring engine identifies opportunities for optimization. It can suggest more efficient or better-suited workflows, reducing redundancy, enhancing performance, and streamlining processes.

iv. Feedback Loop: The monitoring engine acts as a feedback loop to the development teams. It provides insights and recommendations regarding workflow optimization. These recommendations can include suggesting the most appropriate workflow for a given scenario. However, users still have the flexibility to override these suggestions based on their specific needs.

v. Live Environment: The system can operate in a live environment, meaning that it continuously evolves and deploys optimized workflows once it receives consent for the new models. This real-time adaptation ensures that the BPM ecosystem remains dynamic and responsive to changing requirements.

b. Methods for Understanding BPM Metadata:

i. Abstract Syntax Tree (AST): AST is a powerful method used to understand the metadata and logic of BPM workflows. It represents the hierarchical structure of the workflow, breaking it down into individual components, steps, and their relationships. This tree structure enables the system to analyze the workflow's logic and components efficiently.

ii. Knowledge Graph: A knowledge graph is employed to understand the relationships and dependencies within a BPM workflow. It maps out the various steps and sub-components of a workflow and captures their interactions. This knowledge graph helps in visualizing the flow of information, data, and tasks within the BPM process.

iii. Complexity Analysis: Using AST and knowledge graph, the system assesses the complexity of each workflow. It considers factors like the number of steps, the interconnections between steps, data dependencies, and control flows. This analysis is essential in determining the overall complexity of a workflow.

iv. Optimization Insights: By understanding the logic and complexity of BPM workflows, the system gains insights into how these workflows can be optimized. It identifies bottlenecks, redundant steps, and areas where improvements can be made. These insights feed into the optimization process discussed earlier.

Thus, the BPM Workflow Monitoring Engine operates as a dynamic and evolving system that continuously monitors BPM applications, identifies opportunities for optimization, and provides feedback to development teams. It leverages methods like AST and Knowledge Graphs to gain a deep understanding of BPM metadata, logic, and complexity. This understanding is relevant for suggesting and implementing optimized workflows that enhance efficiency and performance in the BPM ecosystem.

Regarding LSTM (Long Short-Term Memory) and GPT (Generative Pre-trained Transformer) systems (and the like or other generative AI) as illustrated in FIG. 6, it can be further understood as follows:

a. LSTM (Long Short-Term Memory) (or the like):

i. Anomaly Detection: LSTM, as a type of recurrent neural network, plays a critical role in monitoring BPM workflows. Its primary function is to detect anomalies or differences between two distinct BPMs. When a new BPM is released or deployed, the LSTM system compares it with the previous version or existing BPMs.

ii. Difference Analysis: LSTM analyzes the differences between BPMs and evaluates their significance. If the differences are found to be substantial, LSTM flags them as noteworthy. On the other hand, if the differences are mirror or insignificant, it suggests that merging the new BPM with the existing one could be a more resource-efficient approach.

iii. Optimization Recommendation: Based on its difference analysis, LSTM can make recommendations to users or system administrators. For instance, it might recommend merging similar BPMs to avoid resource duplication or suggest that deploying a new BPM may not be necessary if it closely resembles an existing one.

iv. Resource Efficiency: LSTM's insights contribute to resource efficiency within the BPM ecosystem. It helps users make informed decisions about whether to proceed with deploying a new BPM or consider alternative approaches that conserve resources.

b. GPT (Generative Pre-trained Transformer) (or the like):

i. Natural Language Understanding: GPT is a transformer-based model that excels in natural language understanding. In this context, it serves as a prompt generation system. Users interact with this system by providing requirements, prompts, or instructions in plain English or natural language.

ii. Contextual Understanding: GPT's strength lies in its ability to understand the context of user requirements. It analyzes the input prompts to extract the user's intent and expectations. This contextual understanding is relevant for generating BPM workflows that align with the user's needs.

iii. Self-Attention Mechanism: GPT employs a self-attention mechanism to focus on relevant parts of the input and extract meaningful information. This mechanism allows it to identify key aspects of the user's prompt and generate responses that address those aspects effectively.

iv. BPM Construction: Once GPT has comprehended the user's requirements and intent, it proceeds to construct BPM workflows. It generates BPMs based on the extracted information and the context provided in the prompts. These BPMs are designed to meet the user's specific needs or requests.

v. Applicability Across Systems: The flexibility of the GPT system makes it applicable to a wide range of scenarios. Users can interface with GPT regardless of the underlying BPM system. Whether the BPM application is based on PEGA or any other platform, GPT can be utilized to generate BPM workflows by providing the necessary metadata and requirements.

In short, LSTM plays a relevant role in monitoring BPM workflows, detecting differences, and optimizing resource usage. It provides recommendations based on the significance of differences between BPMs. On the other hand, GPT specializes in natural language understanding and prompt-based BPM generation. It understands user requirements, extracts context, and constructs BPMs tailored to meet those requirements. Both LSTM and GPT contribute to the efficiency and adaptability of the BPM optimization process across various systems.

AI though the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An artificial intelligence and quantum simulation system for merging, optimizing, and managing workflow processes, comprising:

a user interface designed to receive various types of workflow requirements, including textual, graphical, and data-driven inputs;

a generative artificial intelligence (AI) module equipped with machine learning algorithms, capable of processing natural language inputs, generating workflow templates, and refining future suggestions based on user interactions;

a quantum computing module configured for simulation of complex workflow scenarios, including multi-variable optimization and predictive modeling based on complexity parameters of activity complexity, control-flow complexity, data-flow complexity, and resource complexity, wherein the quantum computing module speeds up processing of workflow templates generated by the generative artificial intelligence module and simulates the workflow templates to provide insights into potential performance of the workflow templates;

a blockchain network for secure workflow deployment, specifying the type of blockchain and employing smart contracts for automating workflow processes;

multiple specialized modules, including:

a prompt management module for handling diverse user queries;

a metadata extraction module capable of processing metadata from a workflow repository;

an analysis module with analytical methods for workflow assessment;

an optimization module configured to optimize merged workflows using algorithms for streamlining the merged workflows, utilizing clustering techniques and LSTM neural networks for performance complexity scoring, to identify inefficiencies, bottlenecks, and areas requiring improvement, and create optimized workflows as solutions to the identified inefficiencies;

a deployment orchestration module for deploying workflows in various operational environments;

a continuous monitoring module for real-time monitoring and automated workflow adjustments;

a customization and scalability module allowing the system to adapt to different industry needs and workload demands;

an integration module to enable integration with existing enterprise systems and software;

security software to provide data encryption and access control; and a user feedback module for collecting insights on workflow efficiency and system usability;

a processor configured to merge workflows from various systems using the generative artificial intelligence module to integrate the workflows while ensuring data integrity and maintaining efficiency, wherein the merging addresses compatibility issues, data loss risks, complexity in integration, workflow disruptions, lack of automation in merging processes, regulatory compliance, loss of process integrity, resource intensiveness, change management difficulties, and quality assurance;

wherein each module comprises computer-executable instructions stored on computer-readable media.

2. The system of claim 1, where the continuous monitoring module includes an anomaly detection module for identifying and addressing workflow inefficiencies in real-time.

3. The system of claim 2, where the generative AI module additionally employs deep learning techniques for enhanced pattern recognition and predictive analytics in workflow template generation.

4. The system of claim 3, wherein the quantum computing module further includes a feature for real-time adjustment of workflows based on predictive analytics outcomes.

5. The system of claim 4, where the blockchain network includes a feature for automatically updating smart contracts in response to changes in workflow parameters or system outputs.

6. The system of claim 5, wherein the prompt management module additionally includes a user history tracking feature to personalize responses based on past interactions.

7. The system of claim 6, where the data extraction module is further enhanced with an ability to integrate and process unstructured data sources.

8. The system of claim 7, wherein the analysis module includes statistical modeling tools for performance assessment of the workflows.

9. The system of claim 8, where the optimization module employs AI-based resource allocation algorithms for optimizing workflow resource utilization.

10. The system of claim 9, wherein the deployment orchestration module is further capable of deploying workflows in a cloud computing environment.

11. An artificial intelligence and quantum simulation method for merging, optimizing, and managing workflow processes, comprising the steps of:

receiving detailed workflow requirements via a multi-functional user interface, where the interface supports input modalities including, but not limited to, textual entry, voice commands, graphical data import, and direct data feed integration;

utilizing a generative artificial intelligence (AI) module, where the module processes inputs through natural language processing algorithms, machine learning techniques, and contextual analysis to generate initial workflow configurations;

implementing quantum computing simulations for each proposed workflow, wherein the simulations analyze multiple operational scenarios, assess potential bottlenecks, and identify optimization opportunities through quantum-based predictive algorithms, wherein the quantum computing simulations speed up processing of workflow templates generated by the generative artificial intelligence module and simulate the workflow templates to provide insights into potential performance of the workflow templates;

merging, by a processor, workflows from various systems using the generative artificial intelligence module to integrate the workflows while ensuring data integrity and maintaining efficiency, wherein the merging addresses compatibility issues, data loss risks, complexity in integration, workflow disruptions, lack of automation in merging processes, regulatory compliance, loss of process integrity, resource intensiveness, change management difficulties, and quality assurance;

integrating workflow configurations with a blockchain network, employing specific smart contract protocols to ensure workflow execution integrity, data security, and compliance with predetermined operational parameters;

operating a suite of specialized modules, where each module executes distinct functions:

a prompt management module with adaptive response capabilities, utilizing user interaction history to personalize future interactions and workflow suggestions;

a data extraction module capable of processing heterogeneous data formats, extracting relevant information, and standardizing data for system-wide use;

an analysis module that employs both statistical and AI-driven tools to evaluate workflow performance metrics, providing insights into efficiency and effectiveness;

an optimization module that implements a combination of machine learning, heuristic algorithms, and resource allocation models to optimize the merged workflows, utilizing clustering techniques and LSTM neural networks for performance complexity scoring, to streamline the merged workflows, identify inefficiencies, bottlenecks, and areas requiring improvement, and create optimized workflows as solutions to the identified inefficiencies;

a deployment orchestration module equipped to handle diverse operational environments, including cloud-based, on-premises, and hybrid infrastructure setups;

a continuous monitoring module that not only tracks workflow execution in real-time but also employs anomaly detection algorithms to preemptively identify and address potential issues;

tailoring system functionalities to align with specific industry requirements, regulatory constraints, and organizational goals, ensuring a customizable and scalable solution;

integrating an BPM optimization system with existing enterprise resource planning (ERP) and customer relationship management (CRM) systems for cohesive operational management;

implementing multi-layered security protocols, including end-to-end encryption, role-based access control, and continuous security auditing, to safeguard data integrity and compliance; and establishing a feedback loop module that captures user experiences, system performance data, and workflow efficacy metrics, utilizing this information for iterative improvements and system updates;

wherein each module comprises computer-executable instructions stored on computer-readable media.

12. The method of claim 11, further comprising the step of enhancing the natural language processing capabilities of the generative AI module to interpret and process industry-specific jargon and terminologies.

13. The method of claim 12, wherein the quantum computing simulations are further refined to include real-time data feeds, enabling dynamic adjustment of workflow simulations based on current operational data.

14. The method of claim 13, additionally involving customization of smart contract protocols on the blockchain network to align with specific regulatory compliance requirements of different industries.

15. The method of claim 14, wherein the prompt management module further includes multilingual support, enabling interaction with users in multiple languages for global application.

16. The method of claim 15, further comprising the step of integrating data visualization tools within the analysis module for more effective presentation and interpretation of workflow performance metrics.

17. The method of claim 16, wherein the optimization module further employs environmental impact assessments to optimize workflows for sustainability and reduced carbon footprint.

18. The method of claim 17, involving an additional step where the continuous monitoring module utilizes machine learning algorithms to predict future workflow challenges and recommend preemptive adjustments.

19. An artificial intelligence and quantum simulation method for merging, optimizing, and managing workflow processes, comprising the steps of:

receiving workflow requirements through a detailed user interface, capable of handling various types of inputs including textual, graphical, and data-driven inputs;

processing the workflow requirements using a generative artificial intelligence (AI) module equipped with machine learning algorithms;

simulating complex workflow scenarios using a quantum computing module, which includes multi-variable optimization and predictive modeling, wherein the quantum computing module speeds up processing of workflow templates generated by the generative artificial intelligence module and simulates the workflow templates to provide insights into potential performance of the workflow templates;

merging, by a processor, workflows from various systems using the generative artificial intelligence module to integrate the workflows while ensuring data integrity and maintaining efficiency, wherein the merging addresses compatibility issues, data loss risks, complexity in integration, workflow disruptions, lack of automation in merging processes, regulatory compliance, loss of process integrity, resource intensiveness, change management difficulties, and quality assurance;

employing a blockchain network for secure deployment of workflows, where the blockchain network uses smart contracts to automate workflow processes;

operating multiple specialized modules, including:

a prompt management module for handling diverse user queries and providing personalized responses;

a data extraction module for processing and normalizing data from various sources;

an analysis module with analytical methods for workflow performance assessment;

an optimization module configured to optimize the merged workflows using algorithms for streamlining the merged workflows and AI-based resource allocation, utilizing clustering techniques and LSTM neural networks for performance complexity scoring, to identify inefficiencies, bottlenecks, and areas requiring improvement, and create optimized workflows as solutions to the identified inefficiencies;

a deployment orchestration module for deploying the workflows across various operational environments;

a continuous monitoring module for real-time monitoring and automated adjustments of the workflows;

customizing and scaling the system based on different industry needs and workload demands;

integrating the system with existing enterprise systems and software for operational continuity; and implementing comprehensive security measures, including data encryption and access control;

wherein each module comprises computer-executable instructions stored on computer-readable media.

20. A workflow optimization method for merging, optimizing, and managing workflow processes performed by a workflow optimization system that includes a processor and a non-volatile memory storing computer-executable instructions, the method comprising:

receiving, by a user interface of the workflow optimization system, workflow requirements via the user interface, wherein the workflow requirements include textual inputs, graphical inputs, and data-driven inputs;

processing, by a generative artificial intelligence module of the workflow optimization system, natural language inputs from the workflow requirements using the generative artificial intelligence module equipped with machine learning algorithms to generate workflow templates;

simulating, by a quantum computing module of the workflow optimization system, complex workflow scenarios using the quantum computing module, wherein the simulating includes multi-variable optimization and predictive modeling based on complexity parameters including activity complexity, control-flow complexity, data-flow complexity, and resource complexity, and wherein the quantum computing module speeds up processing of the workflow templates and simulates the workflow templates to provide insights into potential performance of the workflow templates;

merging, by the processor, workflows from various systems using the generative artificial intelligence module to integrate the workflows while ensuring data integrity and maintaining efficiency, wherein the merging addresses compatibility issues, data loss risks, complexity in integration, workflow disruptions, lack of automation in merging processes, regulatory compliance, loss of process integrity, resource intensiveness, change management difficulties, and quality assurance;

optimizing, by an optimization module of the workflow optimization system, the merged workflows using the optimization module that utilizes clustering techniques and long short-term memory neural networks for performance complexity scoring to streamline the merged workflows, identify inefficiencies, bottlenecks, and areas requiring improvement, and create optimized workflows as solutions to the identified inefficiencies;

deploying, by a blockchain network of the workflow optimization system, the optimized workflows using the blockchain network that employs smart contracts to automate workflow processes and ensure security and integrity; and monitoring, by a continuous monitoring module of the workflow optimization system, the deployed workflows in real-time using the continuous monitoring module to make automated adjustments, wherein each module comprises computer-executable instructions stored on the non-volatile memory.

* * * * *